United States Patent [19]
Fujita et al.

[11] Patent Number: 5,603,208
[45] Date of Patent: Feb. 18, 1997

[54] COMPOSITE RUBBER BODIES USING STEEL CORDS FOR THE REINFORCEMENT OF RUBBER ARTICLES

[75] Inventors: Masuhiro Fujita; Hironori Sakaguchi; Akihiro Kaneda, all of Kuroiso, Japan

[73] Assignee: Bridgestone Bekaert Steel Cord Co., Ltd., Tokyo, Japan

[21] Appl. No.: 388,846

[22] Filed: Feb. 15, 1995

Related U.S. Application Data

[63] Continuation-in-part of Ser. No. 163,697, Dec. 9, 1993, abandoned.

[30] Foreign Application Priority Data

Dec. 10, 1992 [JP] Japan ...................... 4-330708

[51] Int. Cl.⁶ ............... D02G 3/02; D02G 3/36
[52] U.S. Cl. ............... 57/200; 57/212; 57/236; 57/242; 57/902
[58] Field of Search ............... 57/212, 236, 242, 57/902, 200; 148/599, 320; 72/467

[56] References Cited

U.S. PATENT DOCUMENTS

| | | | |
|---|---|---|---|
| 2,349,652 | 5/1944 | Fenner | 72/467 |
| 2,383,118 | 8/1945 | Ferenci | 72/467 X |
| 4,966,216 | 10/1990 | Kawasaki et al. | 57/902 X |
| 5,248,353 | 9/1993 | Nishida et al. | 148/598 |

FOREIGN PATENT DOCUMENTS

| | | |
|---|---|---|
| 61-12018 | 4/1986 | Japan . |
| 63-192846 | 8/1988 | Japan . |
| 248605 | 10/1990 | Japan . |

*Primary Examiner*—William Stryjewski
*Attorney, Agent, or Firm*—Sughrue, Mion, Zinn, Macpeak & Seas

[57] ABSTRACT

A composite rubber body is formed by embedding steel cords in rubber and vulcanization-building them. In this case, each of the steel cords is a single steel filament wire or plural twisted steel filament wires obtained by drawing of a wire rod of high carbon steel having a given composition. The filament wires satisfy given relationships between filament diameter and tensile strength before and after the vulcanization and have a retention of loop strength of not less than 55%.

7 Claims, 2 Drawing Sheets

COMPOSITE RUBBER BODIES USING STEEL CORDS FOR THE REINFORCEMENT OF RUBBER ARTICLES

This is a Continuation-in Part of application Ser. No. 08/163,697 filed Dec. 9, 1993 now abandoned.

BACKGROUND OF THE INVENTION

1. Field of the Invention

This invention relates to composite rubber bodies reinforced with steel cords for rubber articles such as pneumatic tires, conveyer belts and the like. More particularly it relates to a composite rubber body attaining reduction of weight and improvement of durability by using steel cords having a high tensile strength and an excellent ductility.

2. Description of the Related Art

In order to reduce the weight of the composite rubber body reinforced with steel cords, it is advantageous to increase the tensile strength of the steel cord constituting the composite rubber body so as to decrease the amount of steel cords used in the composite rubber body with less or thinner steel cords. In order to improve the durability of the composite rubber body, it is advantageous to improve the fatigue resistance of the steel cord. For this end, it is more strongly demanded to improve the tensile strength and fatigue resistance of the steel cord. Further, in order to economically produce such steel cords, it is important to ensure the ductility of each steel filament wire constituting the steel cord to prevent the occurrence of breakage during twisting.

As a technique for improving the tensile strength of the steel cord, there are proposed a technique wherein a carbon content of a wire rod as a starting material for the steel cord is made higher than that of an ordinary wire rod, a technique wherein a wire drawing ratio of the wire rod is increased, and the like. However, the increase of the carbon content or the wire drawing ratio in the wire rod produces a new problem of degrading the fatigue resistance of the steel cord. For this end, in order to improve the fatigue resistance of the steel cord, it is attempted to add new element(s) to the composition of the wire rod as a starting material for the steel cord to form a low alloy steel having a fine pearlite structure, or to decrease the amount of non-metal inclusion in the wire rod, or the like.

JP-A-60-152659 proposes a wire rod for fine wire comprising C: 0.60–0.90 wt %, Si: 0.10–0.50 wt %, Mn: 0.30–1.00 wt %, P: less than 0.10 wt %, S: less than 0.005 wt %, Cu+Ni+Cr<0.10 wt %, total oxygen: not more than 30 ppm and total nitrogen: not more than 30 ppm and having an excellent processability. In Examples thereof, filament wires having a tensile strength of 374–381 kgf/mm² and a reduction of area of 34–37% are obtained by drawing a wire rod of 1.62 mm in diameter to a diameter of 0.23 mm.

JP-A-1-226404 proposes a method of applying steel cords of open structure obtained by 3–5 high-strength steel filament wires having a diameter of 0.13–0.32 mm to a carcass of a tire in order to largely reduce the tire weight and improve the durable life of the tire.

However, expensive elements are used in the low alloy steel, so that the cost of the starting material for the steel cord undesirably rises. On the other hand, when the non-metal inclusion is decreased in the wire rod as far as possible, the production steps become complicated to increase the production cost. In any case, these techniques are disadvantageous in view of economical reasons. Even when such a wire rod is used to produce steel cords, the high tensile strength and good fatigue resistance are not necessarily satisfied at the same time. Especially, the degradation of the fatigue resistance is a serious problem in the rubber articles such as tires and the like subjected to repetitive bending under loading because some of steel filament wires constituting the steel cord are broken by the repetitive bending to bring about the occurrence of cord breakage and hence result in fatigue breakage of the composite rubber body or the tire.

JP-A-60-152659 mentions the tensile strength and reduction of area in the filament wire after the drawing but does not mention the influence by vulcanization at the step of forming the composite rubber body at all, so that there is caused a problem of age embrittlement.

JP-A-1-226404 defines the tensile strength of the filament wire but does not mention the fatigue property of the filament wire at all. Moreover, the resistance to corrosion fatigue in the steel cord of open structure is improved, but there is no description on the mechanical fatigue property.

SUMMARY OF THE INVENTION

It is, therefore, an object of the invention to provide composite rubber body attaining weight reduction and having an excellent durability by using steel cords simultaneously establishing a high tensile strength and an excellent fatigue resistance.

According to the invention, there is the provision of a composite rubber body formed by embedding steel cords in rubber and vulcanization-building them, each of which cords being a single steel filament wire or plural twisted steel filament wires obtained by dry-drawing a wire rod of high carbon steel comprising C: 0.78 wt %, Si: 0.10–0.30 wt %, Mn: 0.30–0.55 wt % and the remainder being iron and inevitable impurities, subjecting the drawn filament to a patenting treatment and wet-drawing to a given diameter, in which all of the filament wires satisfy relationships of the following equations (1) and (2):

$$T_1 \geq 230-148\log D \quad (1)$$

$$T_2 \geq 235-148\log D \quad (2)$$

wherein D is a diameter (mm) of the filament wire and $T_1$ is a tensile strength (kgf/mm²) before the vulcanization and $T_2$ is a tensile strength (kgf/mm²) after the vulcanization, and have a retention of loop strength of not less than 55%.

DESCRIPTION OF THE PREFERRED EMBODIMENTS

Figure 1:
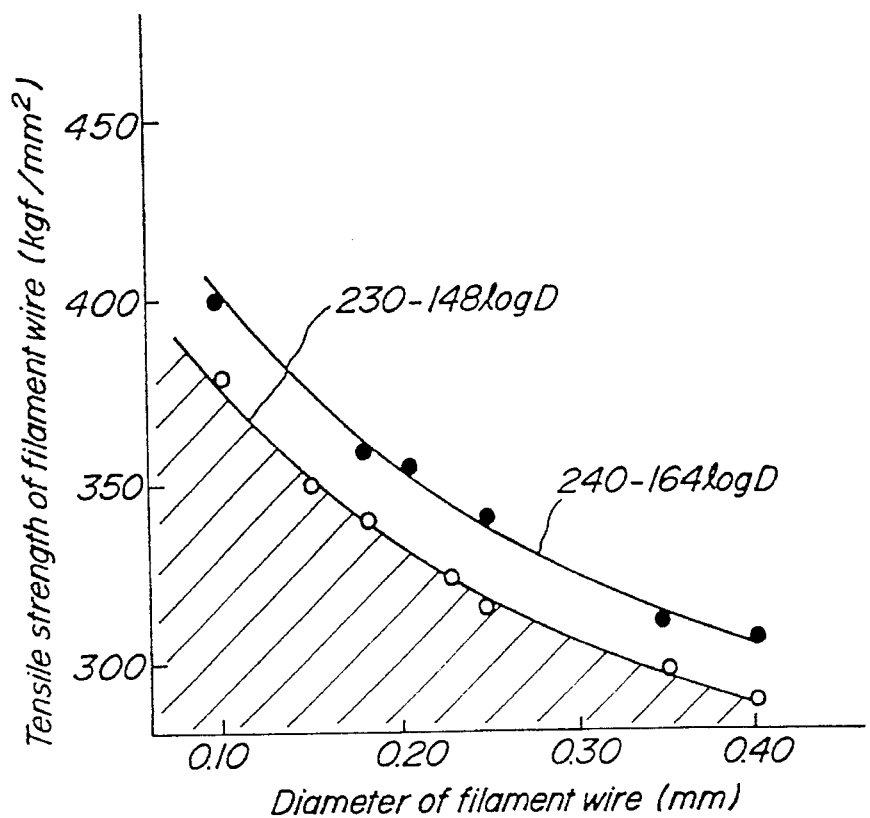
FIG. 1 is a graph showing a relationship between diameter and tensile strength in a filament wire.

According to the invention, wire rods usually used in the formation of steel cords are used because the rise of production cost in the formation of the steel cord can easily be controlled. They have a composition of C: 0.78–0.90 wt %, Si: 0.10–0.30 wt %, Mn: 0.30–0.55 wt % and the remainder being iron and inevitable impurities as mentioned below.

When the C amount is less than 0.78 wt %, it is difficult to render the tensile strength of the filament wire into a target level while controlling the wire breakage during drawing. When it exceeds 0.90 wt %, proeutectoid cementite is apt to be generated in the patenting treatment, which results in wire breakage during drawing and twisting.

When the Si amount is less than 0.10 wt %, it is insufficient to strengthen the ferrite matrix, while when it exceeds 0.30 wt %, the hardening of ferrite matrix is too promoted and hence it is impossible to conduct a high wire drawing.

When the Mn amount is less than 0.30 wt %, it is insufficient to ensure the hardenability during patenting and a given tensile strength is not obtained. When it exceeds 0.55 wt %, the segregation tendency is strong and the high wire drawing is impossible and the desired tensile strength is not obtained.

It is desirable that the amount of inevitable impurities is reduced as far as possible. Particularly, the presence of non-metal inclusion badly affects the wire drawability.

The tensile strength of the filament wire constituting the steel cord is mainly dependent upon the tensile strength of the wire rod after the final heat treatment and the wire drawing ratio at subsequent step. Particularly, in case of plain carbon steel wire rod having a carbon content within a certain defined range without adding a new element, the contribution of the wire drawing ratio is large, so that the tensile strength of the filament wire is considered to be approximately proportional to the wire drawing ratio. However, when wire drawing is conducted at a value exceeding a certain level, the filament wire is broken in the course of the drawing, so that there is an upper limit in the wire drawing ratio. That is, the wire drawing capable of providing a high tensile strength without breakage of the filament wire is restricted to a very narrow range. Therefore, the tensile strength of the filament wire becomes proportional to the diameter of the filament wire.

Since the wire drawing ratio has an upper limit as mentioned above, the tensile strength T (kgf/mm$^2$) of the filament wire constituting the steel cord as the conventional product is within a shadowed region shown in FIG. 1 or a relationship between the diameter and the tensile strength in the filament wire of T<230-148logD.

On the other hand, if it is intended to obtain a filament wire of T≧230-148logD, sufficient strength can be given to a steel cord made from such filament wires. According to the invention, therefore, the tensile strength $T_1$ of the filament wire constituting the steel cord before the vulcanization of the composite rubber body is aimed to be $T_1$≧230-148logD. Especially, when the filament wires are applied to rubber articles such as tires or the like used under severe conditions, the tensile strength $T_1$ is preferable to be $T_1$≧240-164logD.

Further, the tensile strength $T_2$ of the steel wire filament constituting the steel cord taken out from the composite rubber body after the vulcanization satisfies $T_2$≧235-148logD. The reason why the value of $T_2$ is made larger than the value of $T_1$ is due to the fact that the weight reduction and the improvement of durability in the composite rubber body can not be attained if wire drawing is not conducted to an extent that the tensile strength of the filament wire is improved by heating. For instance, excessive wire drawing does not cause the wire breakage during drawing, but there is a case that the tensile strength of the filament wire lowers due to heat hysteresis at the vulcanization step for the formation of the composite rubber body.

The phenomenon of degrading the fatigue resistance when the tensile strength is particularly increased to T≧230-148logD by increasing the wire drawing ratio is due to the fact that susceptivity to flaw becomes high in the surface layer portion of the filament wire. The inventors have made studies with respect to an index for evaluating the susceptivity to flaw and found that the retention of loop strength in the filament wire is an advantageous index for the susceptivity to flaw.

Figure 2:
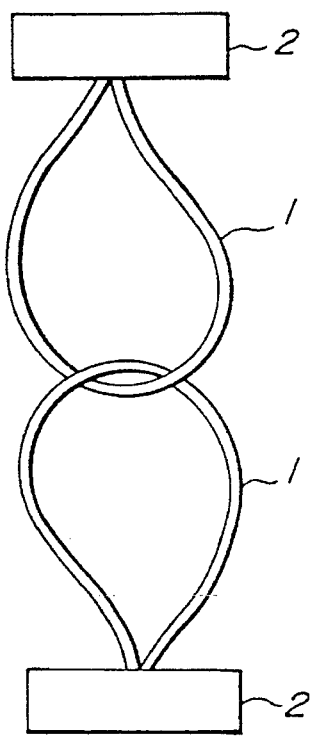
FIG. 2 is a diagrammatical view illustrating a measurement of loop strength.

The retention of loop strength is represented by a ratio of loop strength to tensile strength in the filament wire or a percentage of loop strength/tensile strength. Moreover, the loop strength of the filament wire is a load at breakage when two filament wires 1 are engaged with each other in form of a loop and each of the filament wires 1 fixed to a center of a grip 2 in a tensile testing machine so as to allow free ends of the same filament wire to contact in parallel and make a curvature at the engaged portion between the filament wires constant and then the filament wires are pulled until the occurrence of breakage as shown in FIG. 2.

The reason why the retention of loop strength in the filament wire is adopted as a measure for the evaluation of the fatigue resistance of the steel cord is due to the fact that the retention of loop strength can be measured in a very short time and the susceptivity to flaw in the surface of the filament wire can be measured rapidly and quantitatively to adjust the production conditions for the filament wire from a viewpoint that as the tensile strength of the filament wire constituting the steel cord increases, the susceptivity to flaw in the surface of the filament wire increases to degrade the fatigue resistance of the steel cord and hence degrade the durability of the composite rubber body.

The reason why the retention of loop strength in the filament wire is limited to not less than 55% is due to the fact that when it is less than 55%, the fatigue resistance of the steel cord can not be obtained at a satisfactory level. Particularly, when the retention of loop strength in the filament wire after the vulcanization is less than 55%, the durability of the composite rubber body can not be stabilized.

In order to obtain the retention of loop strength of not less than 55%, there may be adopted means for providing pearlite block size of not less than 10 in the filament wire after final patenting treatment, means for cooling in the wire drawing, means for decreasing the drawing rate in the wire drawing, means for increasing the lubricity in the wire drawing, means for suppressing heat generation by selecting shape, material or the like of the die and the like alone or a combination thereof.

In the steel cord for the reinforcement of rubber articles according to the invention, the filament wire has a diameter of about 0.08–0.60 mm and the cord structure is particularly suitable to be 1×2, 1×3, 1×4, 1×5, 1×6, 1+6, 2+2, 2+6, 2+7, 3+6, 3+8, 3+9, 3+9+15, 1+6+11, 1+6+12, 2+7+12 and the like.

The following examples are given in illustration of the invention and are not intended as limitations thereof.

EXAMPLE 1

A wire rod of 5.5 mm in diameter for the production of steel cords having a composition of C: 0.82 wt %, Si: 0.21 wt %, Mn: 0.49 wt %, P: 0.008 wt %, S: 0.007 wt % and Al: 0.003 wt % is dry-drawn to a wire diameter of 1.44 mm and subjected to a final patenting treatment wherein the drawn wire is heated to 900° C. at a heating rate of 45° C./s held at this temperature for 10 seconds, immediately immersed in a quenching liquid to cool up to 50° C. at a cooling rate of 300° C./s, held at this temperature for 10 seconds to conduct martensite transformation, heated to 800° C. at a heating rate of 200° C./s, held at this temperature for 10 seconds, quenched to 580° C. at a cooling rate of 200° C./s to conduct pearlite transformation. After the patenting treatment, the filament wire has a tensile strength of 132 kgf/mm², a reduction of area of 64% and a pearlite block size of 11 as an ASTM grain size number.

For comparison, the drawn filament wire having the same composition as mentioned above is subjected to a patenting treatment wherein the wire is heated to 900° C. at a heating rate of 45° C./s, held at this temperature for 10 seconds, quenched to 580° C. at a cooling rate of 200° C./s to conduct pearlite transformation. After the patenting treatment, the filament wire has a tensile strength of 130 kgf/mm², a reduction of area of 53% and a pearlite block size of 8 as a grain size number.

The thus patented wire is subjected to an ordinary wet-drawing to obtain a drawn filament wire having a diameter of 0.18 mm and a tensile strength of 406 kgf/mm². Then, a steel cord of 1×5 structure is formed by twisting 5 filament wires among the thus obtained filament wires. Such steel cords are embedded in rubber to prepare a belt-shaped body, which is subjected to a repeated bending fatigue test for a given time to measure the number of wire filaments broken in the steel cord. The results measured on two steel cord samples 1 and 2 taken out at optionally two positions from the belt-shaped body are shown in Table 1.

TABLE 1

| Number of repetitions (times) | 2 × 10⁵ | | 4 × 10⁵ | |
|---|---|---|---|---|
| | sample 1 | sample 2 | sample 1 | sample 2 |
| Acceptable example | 1 | 0 | 1 | 1 |
| Comparative example | 4 | 5 | 5 | 5 |

Then, the retention of loop strength in the filament wire constituting each of the steel cord samples 1 and 2 for the acceptable example and the comparative example is measured according to the method shown in FIG. 2. That is, the retention of loop strength is determined by disentangling the filament wires from the steel cord and measuring the tensile strength and loop strength of each of the filament wires.

Moreover, the retention of loop strength in the filament wire is measured with respect to the filament wire in the steel cord wound on a spool after the twisting without applying thermal hysteresis. On the other hand, in the steel cord of the composite rubber body, the steel cords are embedded in rubber, cured under pressure at 145° C. for 30 minutes and taken out from the rubber and disentangled after the removal of rubber adhered to the steel cord by means of a knife or scissors to take out the filament wires from the steel cord, and thereafter the retention of loop strength is measured with respect to such a filament wire. The measurement is repeated 10 times. The measured results are shown in Table 2.

TABLE 2

| Filament wire | | | Filament wire in composite rubber body | | |
|---|---|---|---|---|---|
| Sample No. | Acceptable example | Comparative example | Sample No. | Acceptable example | Comparative example |
| 1-1 | 58.2 | 47.7 | 1-1' | 58.6 | 46.3 |
| 1-2 | 66.8 | 20.4 | 1-2' | 80.5 | 31.5 |
| 1-3 | 66.5 | 17.2 | 1-3' | 80.7 | 18.2 |
| 1-4 | 76.9 | 43.4 | 1-4' | 85.7 | 47.9 |
| 1-5 | 76.3 | 61.8 | 1-5' | 86.1 | 66.9 |
| 2-1 | 62.6 | 29.4 | 2-1' | 67.1 | 31.4 |
| 2-2 | 61.8 | 28.3 | 2-2' | 66.2 | 49.6 |
| 2-3 | 65.2 | 46.2 | 2-3' | 72.3 | 53.3 |
| 2-4 | 68.7 | 21.0 | 2-4' | 75.4 | 29.6 |
| 2-5 | 72.0 | 45.8 | 2-5' | 79.5 | 48.4 |

As seen from the results of Table 2, the retention of loop strength in the acceptable examples is largely different from that in the comparative examples. In the acceptable examples, the retention of loop strength in all of the filament wire removed by disentangling the twisted steel cord and all of the filament wire taken out from the steel cord embedded in the composite rubber body is not less than 55%, so that the steel cords of the acceptable example have no problem in the fatigue resistance as a reinforcing material for the rubber article.

Further, 20 wires of each of filament wires having different diameters are are prepared by the patenting treatment according to the invention as mentioned above and the minimum retention of loop strength in each filament wire is measured to obtain results as shown in Table 3. As seen from Table 3, the retention of loop strength of not less than 55% is always obtained in the invention irrespectively of the diameter of the filament wire.

TABLE 3

| Diameter of filament wire (mm) | Minimum retention of loop strength (%) |
|---|---|
| 0.10 | 57.7 |
| 0.15 | 56.9 |
| 0.18 | 57.2 |
| 0.20 | 58.1 |
| 0.25 | 57.5 |
| 0.30 | 56.9 |
| 0.36 | 57.8 |
| 0.60 | 56.2 |

EXAMPLE 2

Figure 3:
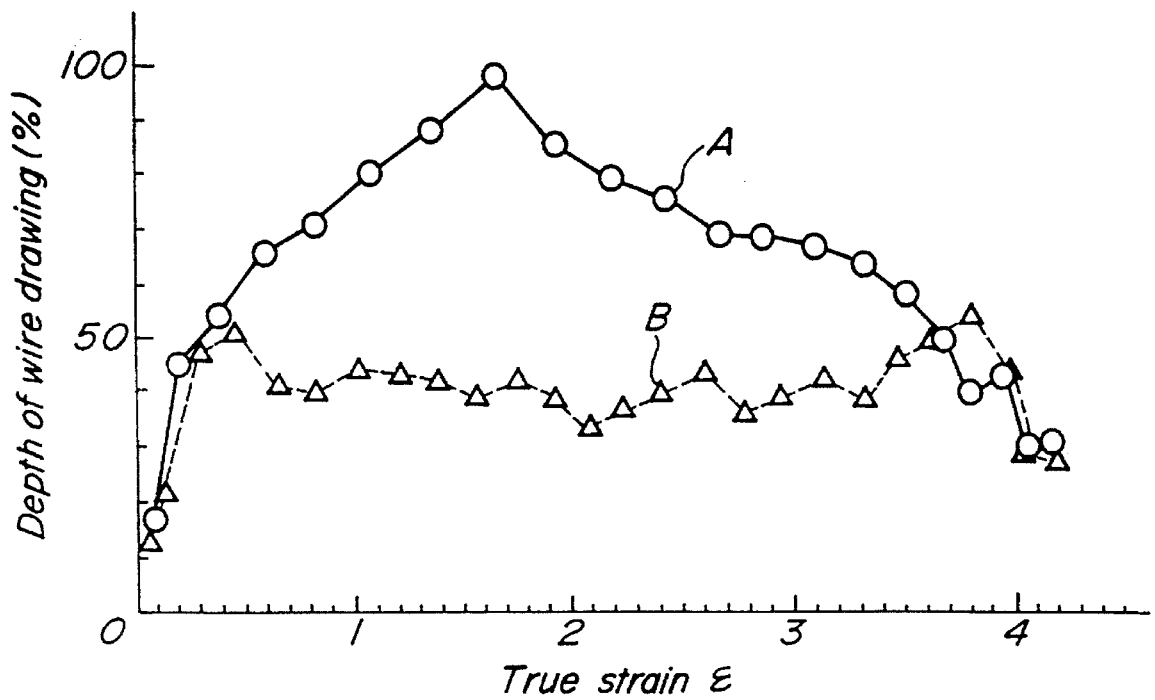
FIG. 3 is a graph showing a die path schedule in wet-type wire drawing.

A wire rod of 5.5 mm in diameter for the production of steel cord having a composition of C: 0.80 wt %, Si: 0.21 wt %, Mn: 0.49 wt %, P: 0.008 wt %, S: 0.007 wt % and Al: 0.003 wt % is dry-drawn to a diameter of 1.44 mm, subjected to a final patenting treatment and then wet-drawn to a filament diameter of 0.18 mm according to a die path schedule A shown in FIG. 3. For comparison, the filament wire is prepared in the same manner as mentioned above except that the die path schedule in the wet-drawing is a schedule B shown in FIG. 3.

Figure 4:
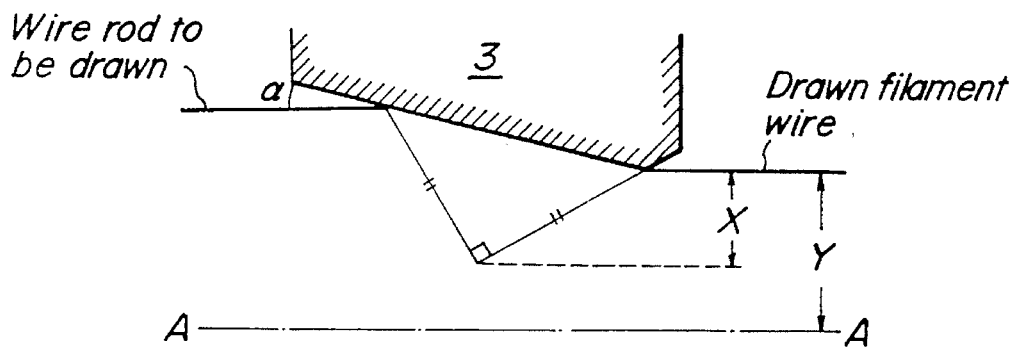
FIG. 4 is a schematic view illustrating a definition of depth of wire drawing.

The term "depth of wire drawing" shown in an ordinate of FIG. 3 means a function for the reduction of area and approach angle in the die and is a simple measure for estimating a degree of compression stress applied to the filament wire from the surface thereof in a central direction in the drawing through a die. As shown in FIG. 4, the depth of wire drawing is represented by (X/Y)×100 when a distance from the surface of the filament wire drawn from a die 1 to the center axial line (A—A) thereof (i.e. a radius of the filament wire drawn from the die) is Y and a distance between the surface of the filament wire drawn from the die and a straight line depicted from a vertex of an isosceles triangle defined by using a portion of the filament wire contacting an approaching part of the die having an approach angle α as a base in parallel with the center axial line of the filament wire is X. As the depth of wire drawing becomes large, the compression stress is uniformly applied from the surface of the filament wire to the inside thereof, whereby the difference in tensile strength between the surface layer portion and the internal portion in the filament wire can be reduced. For instance, when the approach angle α is 4.5° and the reduction of area is 27.06%, the depth of wire drawing is 100%, which means that the compression stress applied to the filament wire through the die reaches to the center of the filament wire.

However, when the die path schedule is defined by rendering the depth of the wire drawing into constant value as shown by the conventional path B in FIG. 3, the surface smoothness of the filament wire is poor at initial stage of final drawing, so that the large depth of wire drawing causes the wire breakage due to poor lubrication. Also, the hardening of the filament wire is promoted at such a region that the true strain exceeds 2, so that the large depth of wire drawing brings about the temperature rise and hence the strength of the surface layer portion increases. Therefore, in order that the retention of loop strength in the filament wire is not more than 55%, the wire drawing is carried out according to a die path schedule as shown by path A in FIG. 3 in accordance with the true strain in the wire drawing. Moreover, the true strain ε in the wire drawing shown in an abscissa of FIG. 3 is defined by the following equation:

$$\epsilon = 2 \ln(d_0/d_1)$$

wherein ln is a natural logarithm, $d_0$ is a diameter of filament wire before the wire drawing, and $d_1$ is a diameter of filament wire after wire drawing.

A plurality of steel cords having a 1×5 twisting structure are prepared by twisting 5 filament wires among the thus obtained filament wires. A greater part of the steel cords are embedded in rubber to form a belt-shaped body, which is subjected to repeated bending fatigue test to measure the number of filament wires broken in the steel cord, while the filament wires are taken out by disentangling from the remaining steel cords and their tensile strength and loop strength are measured to determine the retention of loop strength. The results are shown in Table 4.

TABLE 4

| Acceptable example | | Comparative example | |
|---|---|---|---|
| Sample No. | Retention of loop strength (%) | Number of filament wires broken | Sample No. | Retention of loop strength (%) | Number of filament wires broken |
| A-1 | 72 | 0 | B-1 | 54 | 4 |
| A-2 | 74 | 0 | B-2 | 51 | 4 |
| A-3 | 69 | 0 | B-3 | 52 | 4 |
| A-4 | 75 | 0 | B-4 | 39 | 4 |
| A-5 | 81 | 0 | B-5 | 42 | 4 |

When the wet-drawing is conducted according to the die path schedule A shown in FIG. 3, the wire drawing ratio after the drawing can be made the same in the surface layer portion and internal portion of the filament wire, so that the retention of loop strength is more than about 60% and hence the durability of the composite rubber body can largely be improved.

As mentioned above, the invention can provide composite rubber bodies attaining the weight reduction and having an improved durability by using steel cords having a high tensile strength and an excellent fatigue resistance.

What is claimed is:
1. A composite rubber body formed by embedding steel cords in rubber and vulcanization-building them, each of the cords comprises plural twisted steel filament wires obtained by dry-drawing a wire rod of high carbon steel comprising C: 0.78 wt %, Si: 0.10–0.30 wt %, Mn: 0.30–0.55 wt % and the remainder being iron and inevitable impurities, subjecting the drawn filament to a patenting treatment and wet-drawing to a given diameter, in which all of the filament wires satisfy relationships of the following equations (1) and (2):

$$T_1 \geq 230 - 148 \log D \quad (1)$$

$$T_2 \geq 235 - 148 \log D \quad (2)$$

wherein D is a diameter (mm) of the filament wire and $T_1$ is a tensile strength (kgf/mm$^2$) before the vulcanization and $T_2$ is a tensile strength (kgf/mm$^2$) after the vulcanization, and have a retention of loop strength of not less than 55%.

2. A composite rubber body according to claim 1, wherein the filament wire has a diameter of 0.08–0.60 mm.

3. A composite rubber body according to claim 1, wherein the tensile strength $T_1 \geq 240 - 164 \log D$.

4. A composite rubber body according to claim 1, wherein said plural twisted steel filament comprises a 1×n structure where n is in the range of 2–6.

5. A composite rubber body according to claim 1, wherein said twisted steel filament comprises z+n structure where n is in the range of 2–7.

6. A composite rubber body according to claim 1, wherein said twisted steel filament comprises a 3+n structure and n is in the range of 6–9.

7. A composite rubber body according to claim 1, wherein said twisted steel filament comprises an X+Y+Z structure where $X \geq 1$, $Y \geq 6$ and $Z \geq 11$.

* * * * *